United States Patent [19]

Minnick et al.

[11] Patent Number: 5,440,363
[45] Date of Patent: Aug. 8, 1995

[54] METHOD AND APPARATUS FOR SETTING CAMERA OPERATING MODE ACTIVITY

[75] Inventors: John H. Minnick, Rochester; J. David Cocca, Pittsford, both of N.Y.

[73] Assignee: Eastman Kodak Company, Rochester, N.Y.

[21] Appl. No.: 160,548

[22] Filed: Nov. 30, 1993

Related U.S. Application Data

[63] Continuation-in-part of Ser. No. 997,280, Dec. 23, 1992, abandoned.

[51] Int. Cl.⁶ .................................. G03B 7/00
[52] U.S. Cl. ............................................. 354/21
[58] Field of Search ............................. 354/21, 275

[56] References Cited

U.S. PATENT DOCUMENTS

| | | | |
|---|---|---|---|
| 4,349,272 | 9/1982 | Holthusen | 355/69 |
| 4,437,742 | 3/1984 | Taniguchi | 354/21 |
| 4,443,077 | 4/1984 | Tanikawa | 354/21 |
| 4,490,027 | 12/1984 | Frank et al. | 354/21 |
| 4,579,433 | 4/1986 | Ishizaka e tal. | 354/21 |
| 4,903,055 | 2/1990 | Lourette et al. | 354/21 |
| 4,918,471 | 4/1990 | Harling et al. | 354/21 |
| 4,945,365 | 7/1990 | Fujino | 354/21 |
| 5,030,978 | 7/1991 | Stoneham et al. | 354/21 |
| 5,032,854 | 7/1991 | Smart et al. | 354/21 |

FOREIGN PATENT DOCUMENTS

1259332 10/1989 Japan .

*Primary Examiner*—Howard B. Blankenship
*Attorney, Agent, or Firm*—Francis H. Boos, Jr.

[57] ABSTRACT

A photographic camera having a logic and control circuit programmed to read a mode setting bar code imprinted on a disc mounted on the end of a cartridge adapted to fit in the cartridge receiving chamber of the camera. The disc may be snapped onto a real film cartridge by the camera operator or it may be provided on dummy cartridge specifically intended to program an operating mode of the camera. One dedicated character in the bar code indicative of an operating mode, such as "calibration", "test" or "custom program", causes another character code on the disc, which is normally assigned a meaning relating to film characteristics, to be referred to an alternate look-up table to determine a specific functional operating activity appropriate to the determined camera operating mode. A wide variety of pre-assigned operating mode activities is possible with this arrangement.

8 Claims, 5 Drawing Sheets

METHOD AND APPARATUS FOR SETTING CAMERA OPERATING MODE ACTIVITY

CROSS-REFERENCE TO RELATED APPLICATIONS

This is a continuation-in-part of application Ser. No. 07/997,280, filed Dec. 23, 1992, now abandoned.

FIELD OF INVENTION

This invention relates to the field of photographic film cameras and more specifically to cameras capable of operating in a user selected operating mode.

BACKGROUND

Photographic film cameras normally operate in a single conventional mode of picture taking. Advanced electronic cameras, some programmable features are capable of operating in alternative modes, such as telephoto or panoramic view settings. It is desirable to provide other mode operating capabilities for such purposes as diagnostics and calibration in addition to normal photographic modes. Commonly assigned U.S. Pat. No. 4,903,055 discloses the use of a "dummy" cartridge which, when inserted into the camera, sets the camera in a calibration mode. This cartridge employs a diode on the side of the cartridge in place of the normal DX code which, when sensed, causes the camera shutter to open to allow an operator to calibrate the camera lens. Thus, only a single mode setting capability (calibration) is possible with this type of cartridge. Moreover, such an arrangement is not capable of automatically selecting a particular functional activity from a variety of potential activities suitable for use in the calibration operating mode.

Recently, film cartridges have been proposed that utilize a rotatable radial bar coded disc on the end of the cartridge to convey information to a camera and photofinisher concerning characteristics of the film in the camera, such as film type, ISO(ASA) speed, film length, sequence identification (SID) number and the like. In commonly assigned U.S. Pat. Nos. 5,032,854 and 5,030,978, the bar coded disc is employed to determine the angular setting of the film spool at predetermined visual exposure indicator (VEI) settings upon rewind of film into the camera to thereby provide an indication of the exposure condition of the film in the camera. Additionally, in commonly assigned U.S. Pat. No. 5,321,455, the bar coded disc elements are counted upon rotation of the spool during film loading to provide a simplified technique for automatically determining the VEI setting of the spool to control the loading operation in a manner that avoids any double exposure of the film. These techniques utilizing the radial bar code on the disc are only directed to providing film information and controlling film loading and camera exposure settings based on. such information.

It is an object of the invention, therefore, to provide a method and apparatus for automatically setting the operating mode of a camera.

It is a further object of the invention to provide such method and apparatus capable of selecting from a variety of operating modes for the camera.

It is a further object of the invention to provide such method and apparatus capable of automatically determining, from within an operating mode, a particular functional activity from a range of such activities appropriate to the selected operating mode.

SUMMARY OF THE INVENTION

Thus, in accordance with the invention, there is provided a method of setting operation mode activity in a photographic camera adapted to receive a photographic film cartridge having a rotatable medium bearing an optically machine readable code including at least one character code set normally representative of a characteristic of film in the cartridge, wherein the method comprises reading, from the character code set, information concerning an operating mode of the camera and setting the camera into a predetermined operating mode as indicated by the character code set. In a particular embodiment, the rotatable medium bears an optically machine readable code comprised of a character set including a first character code normally representative of a characteristic of film in the cartridge and a second character code representative of an operating mode of the camera. In this case, the method comprises the steps of reading the second character code and setting the camera in the operating mode represented thereby and reading the first character code and determining from a mode activity lookup table a predetermined. camera mode activity corresponding to the first character code. The operating mode set by the second character code might be a diagnostic mode or a calibration mode, in which case when the particular functional activity is determined from the first character code, the camera might then automatically enter into the particular function. Alternatively, the mode set by the second character code might be a functional setting of the camera for picture taking purposes, e.g. setting the camera in a telephoto mode in which case the camera would then initiate the telephoto settings based on the information determined by the information corresponding to the first character code.

In the apparatus of the invention, there is provided means for sensing the character codes from the coded medium, programmed means responsive to the sensed second character code for setting the camera in a predetermined. operating mode corresponding thereto, storage means for storing a lookup table for providing functional activity control information corresponding to a plurality of activities for each of the set operating modes, the programmed means being further responsive to the sensed first character code for operating said camera in accordance with the functional activity control information corresponding to an activity represented by the first character code.

BRIEF DESCRIPTION OF THE DRAWINGS
In the drawings.

DETAILED DESCRIPTION

Figure 1:
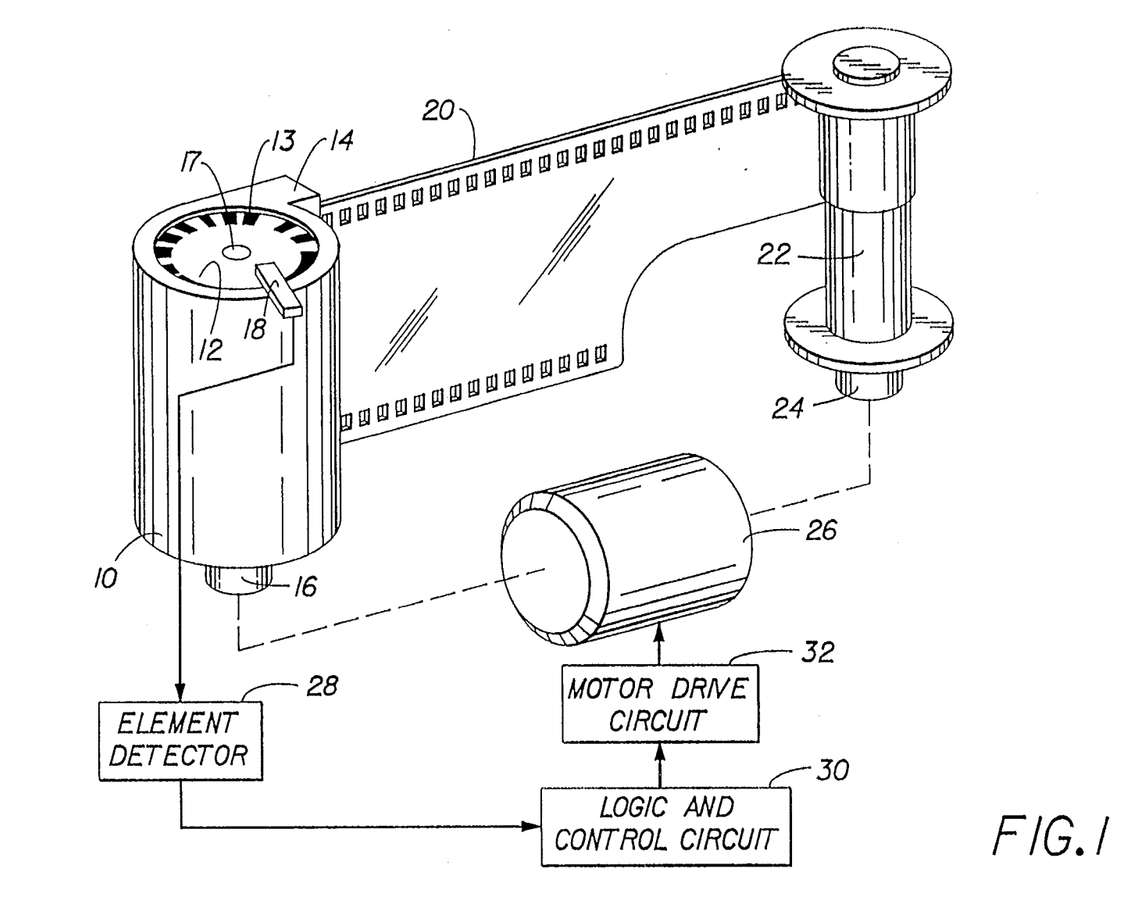
FIG. 1 is a schematic of portions of camera apparatus embodying the present invention.
Figure 8:
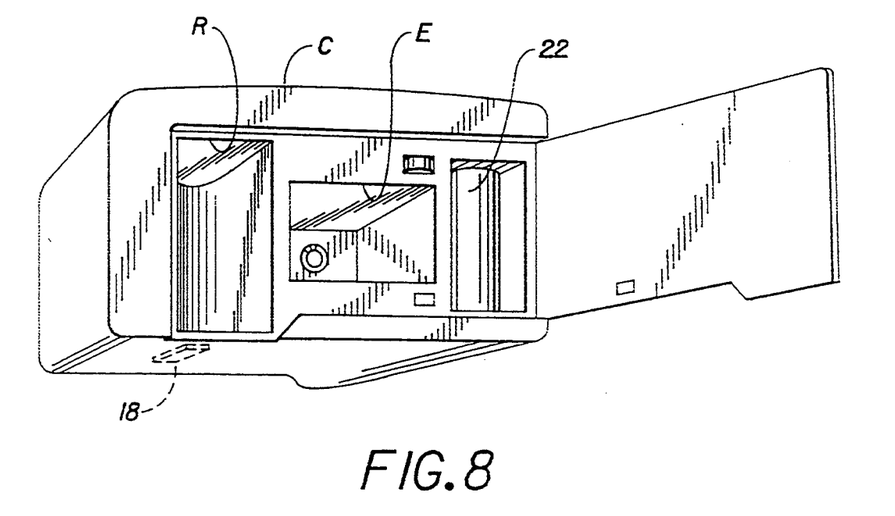
FIG. 8 is a perspective view of a photographic camera in which the present invention is useful.

Referring now to FIG. 1, a photographic film cartridge 10 is positioned in conventional manner in a cartridge receiving chamber R of a camera such C (FIG. 8) that a film strip 20 extends past a film exposure gate E to a film takeup spool 22. The cartridge is preferably of the thrust type in which the film is normally entirely enclosed within the light-tight housing of the cartridge prior to being loaded into the camera. The film is wound onto an internal film spool provided with a drive end 16 which is detachably coupled to a drive motor 26. During a normal film loading operation, motor 26 is activated in known manner by motor drive circuit 32 under the control of logic and control circuit 30 to rotate the film spool in the unwinding direction to thrust the film 20 out the exit 14 of the cartridge toward the takeup spool 22. An externally readable bar coded medium in the form of a disc 12 is mounted on the end of cartridge 10 which is rotatable with the film spool 17. A radial bar code 13 is imprinted on the disc and contains optical machine readable data concerning the characteristics of the film in the cartridge. An optical bar code sensor 18 is located in the cartridge receiving chamber to sense the elements of the bar code in known manner as the disc rotates in association with the film spool during film loading (unwinding) and film unloading (rewind) operations. The signal from sensor 18 is processed by element detector circuit 28 and fed to logic and control circuit 30 for use in performing suitable control of picture taking functions in the camera. As is well known in the art of modern camera design, the logic and control circuit 30 typically includes a microprocessor, an associated memory module for storage of data, such as look up tables, and output control circuits for initiating control of operating modes of the camera.

Figure 2:
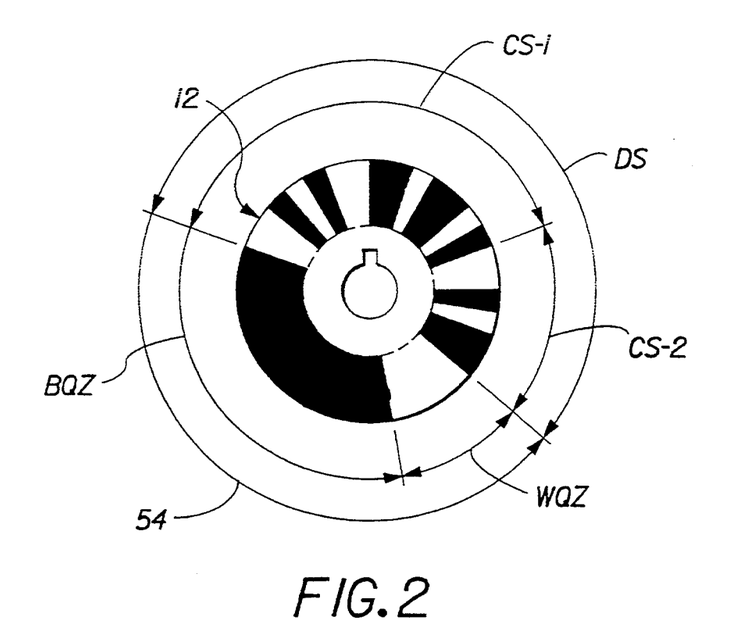
FIG. 2 is a schematic illustration of a bar coded medium in the form of a radially bar coded disc adapted for mounting on the end of a film cartridge and which is useful in explaining the operation of the present invention.

As shown in FIG. 2, the radial bar code may be comprised of a data segment DS, comprised of a first character set CS-1 and second character set CS-2, and an extended synchronizing segment SY, comprised of a black quiet zone element BQZ and a white quiet zone element WQZ. Each of the two character sets in data segment DS consists of two interleaved character codes, one character code being represented by dark elements (bars) and the other by light elements (spaces). In the particular illustrated embodiment, character set CS-1 utilizes a known interleaved "2-of-5" code format in which each of the character codes, spaces for one code and bars for the other, consists of two wide elements and three narrow elements indicative of binary "ones" and "zeros" in the codes. In the embodiment illustrated, the second character set CS-2 is a customized set of two character codes in which each code consists of one wide ("1") and one narrow ("0") element. It will be understood that the code formats shown in FIG. 2 are illustrative only and any suitable code formats may be used within the scope of the present invention.

The purpose of the character representations in the bar code is to provide machine readable information about the film in the cartridge. Typically, this might be ISO film speed, film type (e.g. black/white, color reversal, color negative) and film length (no. of exposures). A presently envisioned assignment of meanings to the bar coded layout illustrated in FIG. 2, is shown in Table I below:

TABLE I

| CS-1: Spaces | ISO Film Speed |
| --- | --- |
| CS-1: Bars | Film Type, ISO modifier |
| CS-2: Spaces | Film length |
| CS-2: Bars | Unassigned |

For each character in the 2-of-5 elements format of the data set CS-1, there are ten possible code combinations. Thus for the two characters in data set CS-1, there are 100 possible code combinations. In the customized four element format of data set CS-2, in which each character is represented by one wide and one narrow element, there is a maximum of four combinations for each character or a total of eight combinations for the two characters in the data set. As indicated in Table I, the character codes represented by the bars in CS-2 are not presently required for purposes of indicating film characteristics. Thus these character codes are available to be assigned as operating mode indicators. By suitable programming, the logic and control circuit in the camera can be instructed to recognize the existence of the character codes represented by the bars in CS-2 as indicating a suitable operating mode for the camera. Since there are a maximum of four possible code combinations, one can be reserved to indicate normal camera operation and the other three can be given the desired assigned meanings, such as "calibration mode", "test mode" and "custom program mode". Once the camera senses the existence of a mode setting code other than the "normal" mode, it then becomes possible to assign alternative meanings to either or both of the character codes in character set CS-1 such that a wide variety of functional activities can be determined for each operating mode set by the bars in character set CS-2. These alternate mode and activity codes would be imprinted on discs that are either attached to a normal film cartridge by the camera operator or are integrally attached to dummy cartridges provided solely for the purpose of camera programming.

Figure 3:
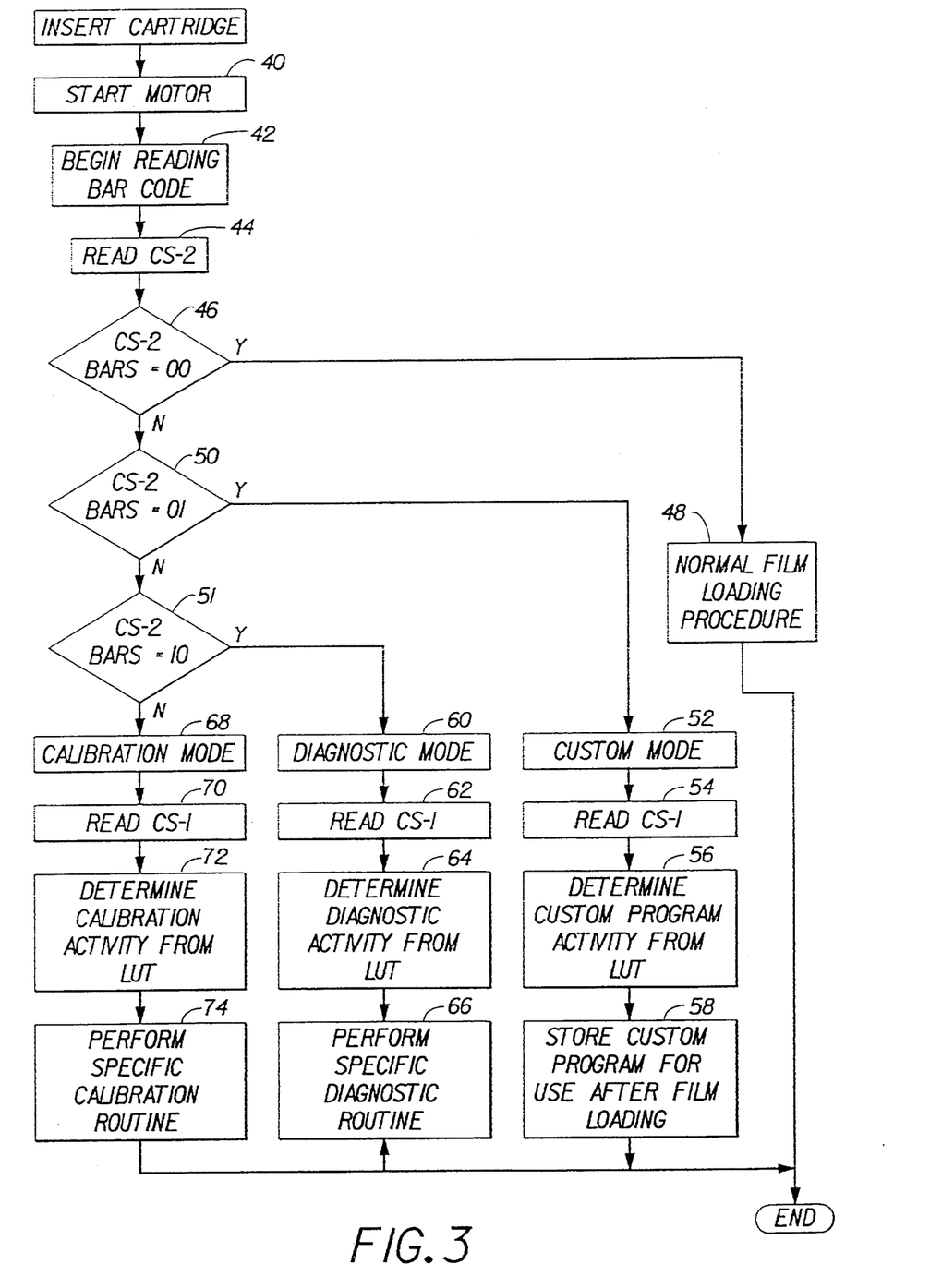
FIG. 3 is a program flow chart for control logic of a camera embodying the present invention.

Thus it is apparent that with this arrangement, a wide variety of alternate camera programmed mode and activities can be invoked by simply inserting the appropriately coded cartridge into the camera. Referring to FIG. 3, the manner in which the camera logic and control circuit 30 could be programmed to operate in this manner is shown. After the cartridge with the special mode coding is inserted in the camera and the motor is started at step 40 to begin spool rotation and to begin reading of the bar code on the disc at step 42. Step 44 reads the character set CS-2 after which query 46 determines from the "bars" character code is "00". If yes, indicating a normal film cartridge, step 48 proceeds with normal film loading procedure. If not, query 50 responds to a "bars" character code of "01" to set the camera in the Custom Program mode at step 52. Step 54 then causes the character set CS-1 to be read. Since the elements of the character code in the CS-1 character set now represents the functional activity to be performed in the Custom Program mode, step 56 determines the specific program activity from a look-up table (LUT) that corresponds to the sensed character code and step 58 causes that program to be stored for use after a normal film cartridge is loaded into the camera. If query 51 determines that the CS-2 "bars" character code is "10", step 60 sets the camera in a Diagnostic mode, step 62 effects reading of the character code in CS-1. From the elements for the character code in CS-1, step 64 identifies the corresponding Diagnostic activity from the LUT and step 66 initiates the specific diagnostic routine. In a similar vein, if the "bars" character code in CS-2 is "11", step 68 sets the camera in the Calibration. mode, step 70 effects reading of the elements of the character code in character set CS-i, step 72 determines the appropriate Calibration activity from the LUT and step 74 initiates the specific calibration routine.

Figure 4:
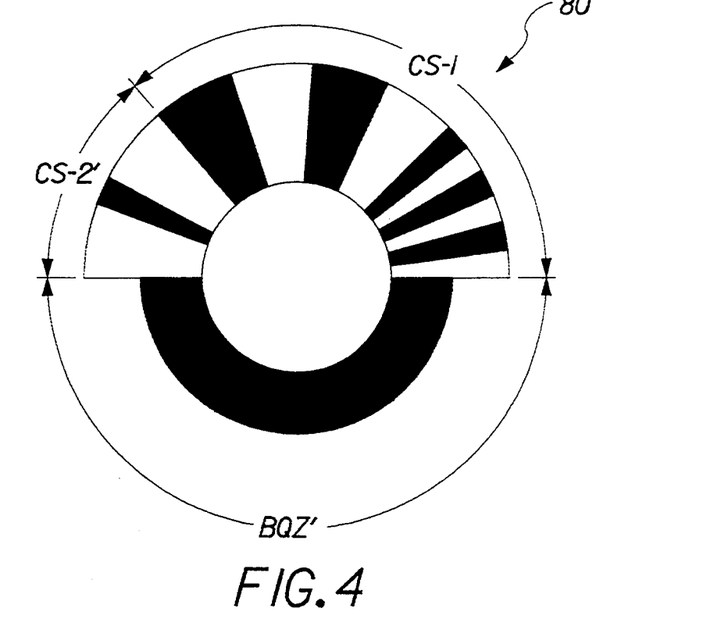
FIGS. 4–7 are illustrations of alternative formats for bar coded mediums useful in the present invention.

FIG. 4 illustrates a presently preferred format for a standard radial bar coded disc 80 used to provide optically readable coded information about film characteristics in a film cartridge. This disc is similar to disc 12 of FIG. 2 in that it includes a first character set CS-1 comprised of an interleaved 2-5 character codes and a second character set CS-2' comprised of customized code elements. It differs in that the character set CS-2' is made up of only three elements, two spaces and one bar. It differs also in that a single continuous dark shaded quiet zone BQZ' is provided with a portion cut out as shown. The cutout is employed in conjunction with a feeler hook in the camera to provide a double exposure prevention (DEP) function which is not related to the present invention. However, the arcuate length of the quiet zone cutout is constrained to a certain minimum length which limits the arcuate length available for the character set segment CS-2'. The use of this format for the present invention is the same as described for the disc 12 of FIG. 2. Table II below shows the character code and corresponding bit code for a representative lookup table for the 2-5 character set CS-1 indicating the film characteristics of the film in the cartridge.

TABLE III

| Length | Elements | | |
|---|---|---|---|
| | White | Black | White |
| Undefined | 0 | 0 | 0 |
| length 1 | 1 | 0 | 0 |
| length 2 | 0 | 1 | 0 |
| length 3 | 0 | 0 | 1 |
| length 4 | 1 | 1 | 0 |
| length 5 | 1 | 0 | 1 |
| length 6 | 0 | 1 | 1 |

In the customized three element format of Table III, there is a theoretical maximum of a total of eight combinations for the elements in the data set. In practice, however, the combinations are limited to a total of seven, since it is generally not feasible with many bar code readers to differentiate between the narrow/narrow/narrow and wide/wide/wide combinations, thus one of these combinations is not used, in this case the wide/wide/wide combination.

Figure 5:
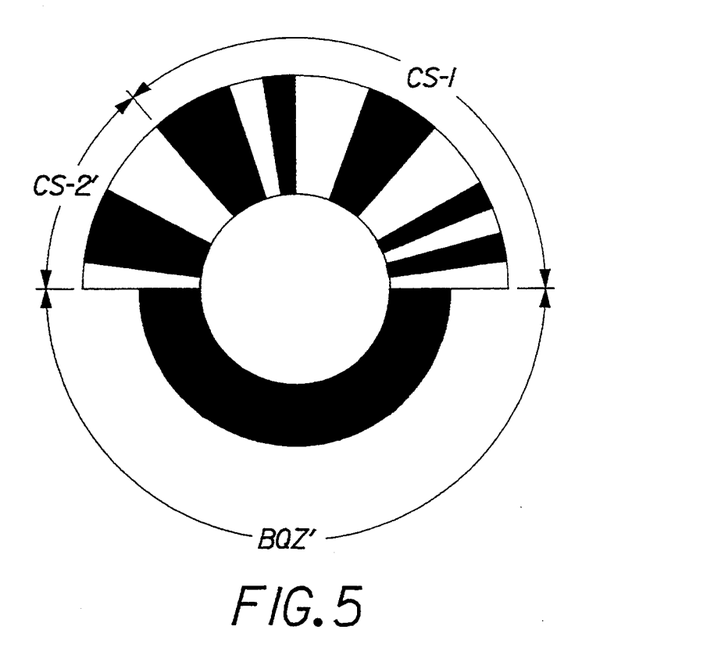

Referring now to FIG. 5, a disc 80 is shown embodying a feature of the present invention in a manner that is compatible with the standard disc format of FIG. 4. As can be seen in the film code assignment Table II, there are certain code values in character set CS-1 that are not assigned to film characteristics. Specifically, the six character codes 04 through 09 are unassigned. In accordance with this embodiment of the invention, these unassigned character codes may be used to indicate specific operating modes and related specific functional activities. The illustrated code disc shows the unas-

TABLE II

| ISO, full stops | Char #1 | Bit code of Char #1 | Film Type, ISO Modifier | | | | Bit Code of Char #2 | | | |
|---|---|---|---|---|---|---|---|---|---|---|
| | | | B&W | CR | CN | other | B&W | CR | CN | Other |
| ** | 0 | 00110 | 0 | 1 | 2 | 3 | 00110 | 10001 | 01001 | 11000 |
| 25 | | | 0 | 1 | 2 | 3 | 00110 | 10001 | 01001 | 11000 |
| 32 | 1 | 10001 | 4 | 5 | 6 | | 00101 | 10100 | 01100 | |
| 40 | | | 7 | 8 | 9 | | 00011 | 10010 | 01010 | |
| 50 | | | 0 | 1 | 2 | 3 | 00110 | 10001 | 01001 | 11000 |
| 64 | 2 | 01001 | 4 | 5 | 6 | | 00101 | 10100 | 01100 | |
| 80 | | | 7 | 8 | 9 | | 00011 | 10010 | 01010 | |
| 100 | | | 0 | 1 | 2 | 3 | 00110 | 10001 | 01001 | 11000 |
| 125 | 3 | 11000 | 4 | 5 | 6 | | 00101 | 10100 | 01100 | |
| 160 | | | 7 | 8 | 9 | | 00011 | 10010 | 01010 | |
| 200 | | | 0 | 1 | 2 | 3 | 00110 | 10001 | 01001 | 11000 |
| 250 | 4 | 00101 | 4 | 5 | 6 | | 00101 | 10100 | 01100 | |
| 320 | | | 7 | 8 | 9 | | 00011 | 10010 | 01010 | |
| 400 | | | 0 | 1 | 2 | 3 | 00110 | 10001 | 01001 | 11000 |
| 500 | 5 | 10100 | 4 | 5 | 6 | | 00101 | 10100 | 01100 | |
| 640 | | | 7 | 8 | 9 | | 00011 | 10010 | 01010 | |
| 800 | | | 0 | 1 | 2 | 3 | 00110 | 10001 | 01001 | 11000 |
| 1000 | 6 | 01100 | 4 | 5 | 6 | | 00101 | 10100 | 01100 | |
| 1250 | | | 7 | 8 | 9 | | 00011 | 10010 | 01010 | |
| 1600 | | | 0 | 1 | 2 | 3 | 00110 | 10001 | 01001 | 11000 |
| 2000 | 7 | 00011 | 4 | 5 | 6 | | 00101 | 10100 | 01100 | |
| 2500 | | | 7 | 8 | 9 | | 00011 | 10010 | 01010 | |
| 3200 | | | 0 | 1 | 2 | 3 | 00110 | 10001 | 01001 | 11000 |
| 4000 | 8 | 10010 | 4 | 5 | 6 | | 00101 | 10100 | 01100 | |
| 5000 | | | 7 | 8 | 9 | | 00011 | 10010 | 01010 | |
| 6400 | | | 0 | 1 | 2 | 3 | 00110 | 10001 | 01001 | |
| 8000 | 9 | 01010 | 4 | 5 | 6 | | 00101 | 10100 | 01100 | |
| 10000 | | | 7 | 8 | 9 | | 00011 | 10010 | 01010 | |

Table III shows the special custom code for character set CS-2' representing the various lengths of film in the cartridge where each length generally corresponds to the number of available image frames on the film strip.

signed character code 04 in character set CS-1 which is seen as bit codes 00110 for the spaces and 00101 for the bars. Moreover, the number of available mode/activity assignments may be markedly increased by suitably programming the camera logic and control circuit to recognize the existence of an unassigned character code in character set CS-1 and thereupon using special mode-/activity assignment for the character codes in character set CS-2'. For the illustrated disc, this increases the mode/activity codes to 42 since there 6 available character codes in CS-1 and 7 in CS-2' (6×7=42).

Figure 6:
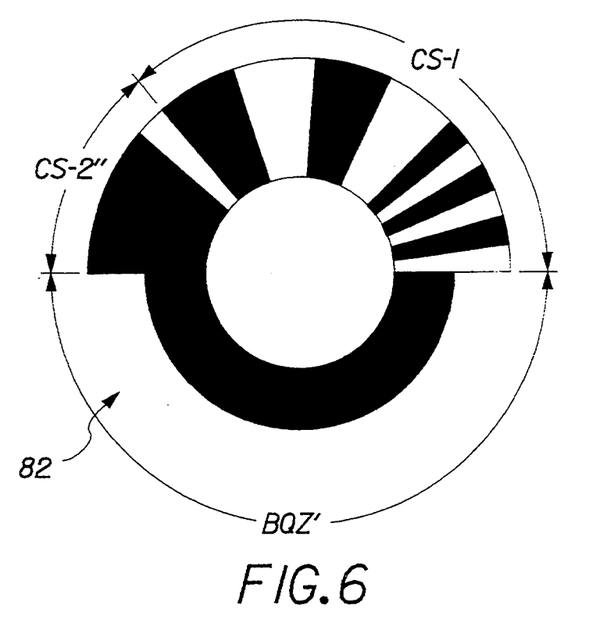

Referring to FIG. 6, a disc 82 is shown which illustrates another embodiment of the invention. This disc is similar to disc 80 of FIG. 4 but differs in that the character set segment CS-2'' does not have the normal custom bar code elements. In this case, the camera is programmed to recognize the absence of a character code in the segment CS-2'' as an instruction for a special mode operation and then reading the specific mode and functional activity from the character set CS-1. A representative table of operating modes and related functional activities for character set CS-1 in this case is shown in Table IV, below:

TABLE IV

| Mode | Char #1 | Bite code of Char #1 | Char #2 | Bit code of Char #2 | Activity |
|---|---|---|---|---|---|
| | | | 0 | 00110 | Bar Code |
| | | | 1 | 10001 | Autoranging |
| Calibration | 0 | 00110 | 2 | 01001 | CdS cell |
| | | | 3 | 11000 | Focus |
| | | | 4 | 00101 | Shutter |
| | | | 5 | 10100 | Film metering |
| Assembly | 1 | 10001 | 0 | 00110 | EOL |
| | | | 0 | 00110 | Autoranger |
| Diagnostic | 2 | 01001 | 1 | 10001 | CdS cell |
| | | | 2 | 01001 | Focus |
| | | | 3 | 11000 | Shutter |
| | | | 0 | 00110 | Battery test |
| QA Tests | 3 | 11000 | 1 | 10001 | Life test |
| | | | 2 | 01001 | Actuations |
| | | | 1 | 00110 | No red eye reduction |
| | | | 1 | 10001 | No Flash |
| Custom | 4 | 00101 | 2 | 01001 | All Flash |
| | | | 3 | 11000 | Multiple exposure |
| | | | 4 | 00101 | Continuous |
| | | | 5 | 10100 | Bulb |

Figure 7:
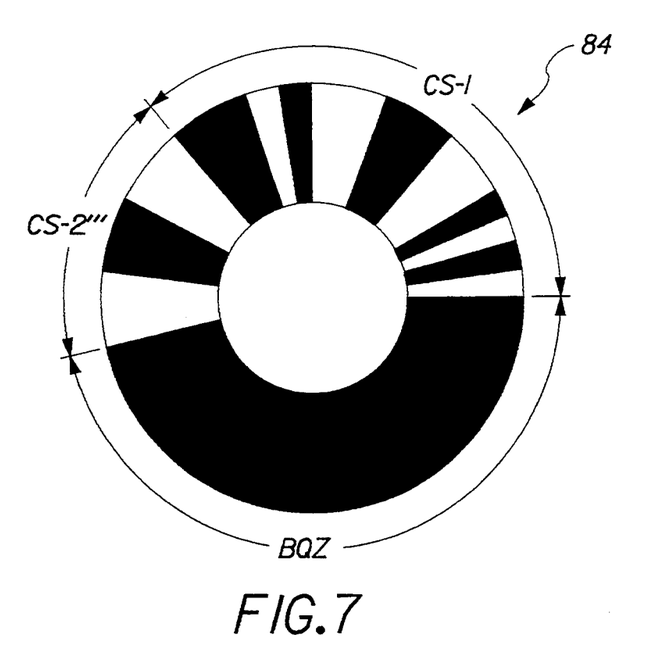

In FIG. 7, an alternative embodiment disc 84 is shown in which the cutout for the quiet zone is eliminated in cases where the DEP feature mentioned above is not required. This removes the constraint on the minimum length of the quiet zone and allows for the use of three wide elements in the character set CS-2'' to indicate that a special operating mode is called for which the camera then reads along with the functional activity from the character set CS-1 in the same manner as described for the disc 82 of FIG. 6.

It will be appreciated from the foregoing that what has been described is a simple and inexpensive arrangement for selective programming of a camera that permits an operator to perform a variety of selectable routines such as diagnostics and calibration and custom camera program modes without special equipment and without the need for physical devices built into the camera, such as mode switches and the like. Moreover, the variety of selectable routines and custom program mode settings that can be built into the camera and utilized at the operator's choice is significantly increased by use of the bar coded characters normally used to indicate film characteristics which can be assigned alternate meanings when using the mode selection character codes on the bar coded disc.

The invention has been described in detail with particular reference to a presently preferred embodiment, but it will be understood that variations and modifications can be effected within the scope of the invention as set forth in the claims appended hereto. For example, the cartridge can be provided with a locking hub provided with a unique locking position that identifies the cartridge as a dummy cartridge for camera mode setting purposes. The camera would then respond to the sensing of this locking position to recognize that it is reading a "dummy" cartridge and to initiate reading of the mode setting and activity setting character codes on the bar coded disc. This would allow some redundancy in verifying the unique cartridge and make mode setting character decoding more straightforward. It would also eliminate the need to use one of the bar code elements to differentiate between "normal" and "mode setting" operation.

What is claimed is:

1. A method of setting operating mode activity in a photographic camera adapted to receive a photographic film cartridge having a rotatable medium bearing an optically machine readable code including a first character code normally representative of a characteristic of film in the cartridge and a second character code representative of a predetermined operating mode of the camera, the method comprising the steps of:

reading said second character code and setting said camera in the predetermined operating mode represented thereby; and reading said first character code and determining from a mode activity lookup table a predetermined camera mode activity corresponding to the operating mode set by said first character code.

2. The method of claim 1 wherein the cartridge includes a hub locking position identifying the cartridge as a mode setting dummy cartridge and the method includes the step of sensing the existence of said hub locking position to initiate a mode setting program in the camera.

3. A method of setting operating mode activity in a photographic camera adapted to receive a photographic film cartridge having a rotatable disc bearing an optically machine readable code having first and second character code set segments, each normally including therein a character code set representing characteristics of film in the cartridge, the method comprising the steps of:

reading, from said second character code set segment, information indicating that said camera is to operate in a special operating mode and reading, from said first character code set segment, information indicating at least a specific predetermined mode in which said camera is to operate; and setting said camera into a predetermined operating mode as indicated by said character code set.

4. The method of claim 5 wherein said reading step further includes reading, from said second character code set, information which also indicates a specific functional activity for said camera associated with said specific predetermined special operating mode and wherein said setting step includes setting said camera to said specific functional activity.

5. A photographic film camera adapted to receive a photographic film cartridge having a rotatable medium mounted thereon bearing an optical machine readable code, the code including first and second character code set segments, at least one of which is normally representative of a characteristic of film in the cartridge, the camera comprising;

an optical sensor for reading said character code set segments said optical sensor being adapted to sense, from said second character set segment, information representative of the fact that a special operating mode is to be set and being further adapted to sense a character code set from said first character set segment;

a look-up table for storing data representative of a plurality of operating mode activities;

mode determining means responsive to reading of said character code set for determining from said look-up table a selected operating mode activity based on the character code read from the first character set segment; and means for initiating said selected operating mode activity in the camera.

6. The camera of claim 5 wherein said mode determining means determines both an operating mode and a mode functional activity from said look-up table based on the character code set read from the first character set segment.

7. The camera of claim 5 wherein said character code set includes a character code selected from a series of character codes which includes codes assigned to be representative of characteristics of film in the cartridge and codes which are not so assigned; said look-up table includes a list of operating modes for said character codes that are not assigned to film characteristics; and said mode determining means responds to reading of a character code not assigned to a film characteristic to determine from the look-up table an operating mode from the character code read from the rotatable medium.

8. The camera of claim 7 wherein said rotatable medium includes first and second character code segments and said mode determining means responds to a character code in one of said segments that is not assigned to a film characteristic to determine that a special operating mode is to be initiated and determines from character codes in either segment what the operating mode and activity is to be initiated.

* * * * *

UNITED STATES PATENT AND TRADEMARK OFFICE
CERTIFICATE OF CORRECTION

PATENT NO. : 5,440,363
DATED : August 8, 1995
INVENTOR(S) : Minnick, et al.

It is certified that error appears in the above-indentified patent and that said Letters Patent is hereby corrected as shown below:

Col. 8, line 54,          "5" should be --3--

Col. 8, line 64,          "optical" should be --optically--

Signed and Sealed this

Eleventh Day of June, 1996

Attest:

BRUCE LEHMAN

Attesting Officer      Commissioner of Patents and Trademarks